US 012517765B2

(12) United States Patent
Daw et al.

(10) Patent No.: US 12,517,765 B2
(45) Date of Patent: Jan. 6, 2026

(54) FRAMEWORK FOR SCHEDULING ACCELERATOR-ENABLED WORKLOADS

(71) Applicant: VMware LLC, Palo Alto, CA (US)

(72) Inventors: Nilanjan Daw, Kolkata (IN); Hari Sivaraman, Livermore, CA (US); Uday Pundalik Kurkure, Los Altos, CA (US); Sairam Veeraswamy, Coimbatore (IN); Lan Vu, Palo Alto, CA (US)

(73) Assignee: VMware LLC, Palo Alto, CA (US)

( * ) Notice: Subject to any disclaimer, the term of this patent is extended or adjusted under 35 U.S.C. 154(b) by 63 days.

(21) Appl. No.: 18/233,344

(22) Filed: Aug. 14, 2023

(65) Prior Publication Data
US 2024/0403129 A1 Dec. 5, 2024

(30) Foreign Application Priority Data

May 29, 2023 (IN) .............................. 202341036881

(51) Int. Cl.
*G06F 11/07* (2006.01)
*G06F 9/50* (2006.01)

(52) U.S. Cl.
CPC ............ *G06F 9/505* (2013.01); *G06F 9/5016* (2013.01); *G06F 11/0721* (2013.01); *G06F 11/0793* (2013.01)

(58) Field of Classification Search
CPC ...... G06F 9/505; G06F 9/5016; G06F 9/5005; G06F 9/5077; G06F 11/0721; G06F 11/0793
See application file for complete search history.

(56) References Cited

U.S. PATENT DOCUMENTS

| | | | |
|---|---|---|---|
| 7,668,703 B1* | 2/2010 | Rolia | G06Q 10/04 703/2 |
| 9,170,849 B2* | 10/2015 | Calder | G06F 9/5088 |
| 10,002,024 B2* | 6/2018 | Di Balsamo | G06F 9/5005 |
| 2017/0153965 A1* | 6/2017 | Nitta | G06F 9/455 |
| 2018/0300176 A1* | 10/2018 | Chen | G06F 9/5027 |
| 2019/0102212 A1* | 4/2019 | Bhandari | G06T 1/20 |
| 2019/0303207 A1* | 10/2019 | Vadapandeshwara | G06F 9/5038 |
| 2020/0314171 A1* | 10/2020 | Featonby | G06F 9/45558 |
| 2022/0291952 A1* | 9/2022 | Milojicic | G06F 9/5005 |

(Continued)

OTHER PUBLICATIONS

Fault Tolerance Using Self-Healing SLA and Load Balanced Dynamic Resource Provisioning by Sohani Scientific Research Support Fund of Jordan Princess Sumaya University for Technology. (Jun. 2021) https://dialog.proquest.com/professional/cv_2188612/docview/26723620 (Year: 2021).*

*Primary Examiner* — Joseph O Schell
(74) *Attorney, Agent, or Firm* — Quarles & Brady LLP (57) ABSTRACT

A framework that may be implemented by a workload orchestration platform for scheduling accelerator-enabled workloads on the accelerators in a cluster is provided. In one set of embodiments, the framework enables the platform to schedule accelerator-enabled workloads based on a multitude of user-provided, fine-grained accelerator requirements. In another set of embodiments, the framework enables the platform to automatically recommend an initial set of accelerator resource requirements for an accelerator-enabled workload and automatically right-size such requirements based on telemetry data collected during the workload's runtime.

15 Claims, 7 Drawing Sheets

(56) References Cited

U.S. PATENT DOCUMENTS

| | | | | |
|---|---|---|---|---|
| 2023/0094384 A1* | 3/2023 | Tikhostoup | ............. | G06F 9/505 |
| | | | | 718/104 |
| 2023/0136365 A1* | 5/2023 | Gupta | ................... | G06F 9/3877 |
| | | | | 712/225 |

* cited by examiner

FRAMEWORK FOR SCHEDULING ACCELERATOR-ENABLED WORKLOADS

RELATED APPLICATIONS

Benefit is claimed under 35 U.S.C. 119(a)-(d) to Foreign Application Serial No. 202341036881 filed in India entitled "FRAMEWORK FOR SCHEDULING ACCELERATOR-ENABLED WORKLOADS", on May 29, 2023, by VMware, Inc., which is herein incorporated in its entirety by reference for all purposes.

BACKGROUND

Unless otherwise indicated, the subject matter described in this section should not be construed as prior art to the claims of the present application and is not admitted as being prior art by inclusion in this section.

A workload orchestration platform automates the deployment, management, and scaling of software workloads, such as containerized applications or virtual machines (VMs), on a cluster of computer systems. Examples of workload orchestration platforms include Kubernetes, Docker Swarm, and VMware's Distributed Resource Scheduler (DRS).

Many modern workloads are designed to run on hardware accelerators like graphics processing units (GPUs). To facilitate the deployment of such workloads (referred to herein as accelerator-enabled workloads), some workload orchestration platforms allow users to specify accelerator requirements at the time of workload creation. The platforms use these requirements to guide how the created workload is deployed (or in other words, scheduled) on available accelerators in a cluster.

Unfortunately, current implementations of this functionality are very limited in terms of the scope of accelerator requirements they support. For example, with Kubernetes, a user that creates a GPU-accelerated application can only specify the number of GPUs on which the application should run. While this enables a basic degree of user control over the deployment process, it lacks the flexibility needed by users to influence the scheduling of accelerator-enabled workloads that have more detailed and granular accelerator requirements.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

Embodiments of the present disclosure are directed to a framework that may be implemented by a workload orchestration platform for scheduling accelerator-enabled workloads on the accelerators in a cluster. As used herein, the phrase "scheduling a workload on an accelerator" refers to the act of assigning the workload to that accelerator so that the workload, or some portion thereof, can be executed using the accelerator's hardware resources.

According to one set of embodiments, this framework enables the platform to schedule accelerator-enabled workloads based on a multitude of user-provided, fine-grained accelerator requirements. This is in contrast to existing workload orchestration platforms, which restrict users to specifying only coarse-grained requirements like GPU count. Examples of these fine-grained accelerator requirements include accelerator type, architecture, or model; an allocation of accelerator compute and/or memory resources; service level agreements (SLAs) pertaining to accelerator response time, availability, throughput, cost of execution, and/or other metrics; and a prioritized accelerator list (such that a workload is deployed on the highest priority accelerator that meets the other requirements). With this granular scheduling capability, a broad spectrum of different accelerator-enabled workloads can be scheduled in a manner that is consistent with their individual accelerator needs and preferences.

According to another set of embodiments, the framework enables the platform to automatically recommend an initial set of accelerator resource requirements for an accelerator-enabled workload, as well as automatically right-size such requirements based on telemetry data collected during the workload's runtime. The right-sized requirements can then be used in lieu of the initial requirements when the workload is scheduled again in the cluster.

1. Example Cluster and Solution Overview

Figure 1:
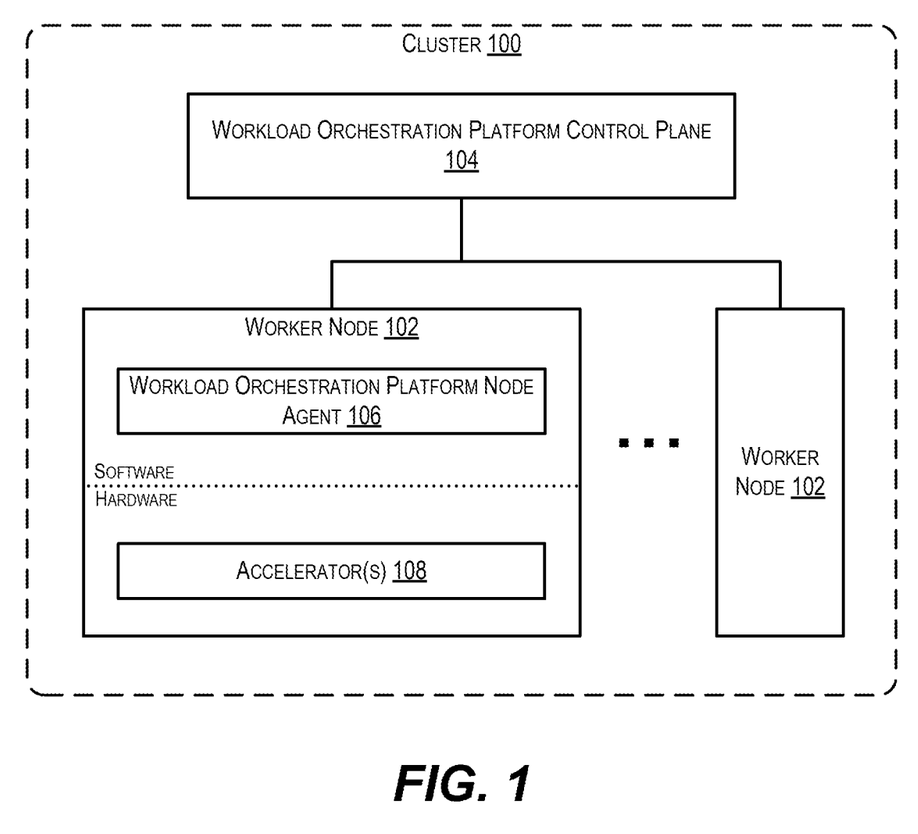
FIG. 1 depicts an example cluster that employs a workload orchestration platform according to certain embodiments.

To provide context for the embodiments described herein, FIG. 1 is a simplified block diagram of an example cluster 100 that implements a workload orchestration platform such as Kubernetes, Docker Swarm, VMware DRS, or the like. As shown, cluster 100 comprises a number of worker nodes 102 that are communicatively coupled with a control plane 104 of the platform.

Worker nodes 102 are computer systems that are configured to execute the workloads created by users (e.g., developers, administrators, etc.) of cluster 100. This node-level workload execution is managed by a workload orchestration platform node agent 106 (hereinafter simply "node agent") that runs on each worker node.

Control plane 104 is a computer system or group of computer systems that is responsible for managing the overall state and operation of cluster 100, including scheduling (or in other words, deploying/placing) user-created workloads on specific worker nodes. For example, upon receiving a specification of a new workload W, control plane 104 identifies one or more worker nodes 102 that are available/suitable for running W and schedules a deployable unit of W (e.g., a Kubernetes pod) on each of the identified worker nodes. As part of this scheduling process, control plane 104 transmits a specification of that workload unit (e.g., a pod specification) to node agent 106 of said each worker node. The node agent then initiates execution of the workload unit on the worker node in accordance with the received specification.

For the purposes of this disclosure, it is assumed that each worker node 102 includes one or more accelerators 108, which are hardware components that are designed to perform certain functions more efficiently than general purpose processors. Examples of such accelerators include GPUs, tensor processing units (TPUs), secure crypto-processors, digital signal processors (DSPs), and so on. Although not shown in FIG. 1, each accelerator 108 comprises a set of compute resources and a set of memory resources that may be allocated to consumers of the accelerator. For instance, the Nvidia Ampere A100 GPU includes 6192 processing cores and 40 gigabytes (GB) of video memory (i.e., VRAM) that may be allocated to consumers under a virtual GPU sharing model or a multi-instance GPU (MIG) model.

In addition, it is assumed that the workloads created by the users of cluster 100 include accelerator-enabled workloads, or in other words workloads that are programmed to run on accelerators 108. Examples of accelerator-enabled workloads include 3D games, machine learning (ML) and artificial intelligence (AI) applications, video processing, data analytics, high performance computing (HPC), and so on. In this scenario, part of the job of control plane 104 is to schedule such workloads on specific accelerators in the cluster so that the workloads can run there.

As mentioned previously, some workload orchestration platforms like Kubernetes allow users to specify accelerator requirements at the time of workload creation, which are then used to guide workload scheduling. However, current support for this functionality is generally limited to specifying the total number of accelerators required. With the emergence of workload-tailored accelerators, increasing workload complexity, and other factors, such a coarse-grained approach is too restrictive to fulfill the needs of modern accelerator-enabled workloads. For example, a user that creates a neural network (NN) training workload may want the workload to run on a specific GPU architecture that has specialized processing cores designed to accelerate NN training, and with a particular allocation of GPU resources that ensure the training can be completed successfully. This is not possible with existing workload orchestration platforms.

Another related problem is that, even with the ability to support more granular accelerator requirements such as resource allocations, estimating the appropriate amount of resources needed for a given workload is often difficult for users to get right. Overestimating such requirements can lead to an unnecessary increase in operating and capital expenses, while underestimating such requirements can lead to degraded workload performance or outright failure. Further, in many situations the resource requirements for a workload can change over time, thereby invalidating initial estimations.

Figure 2:
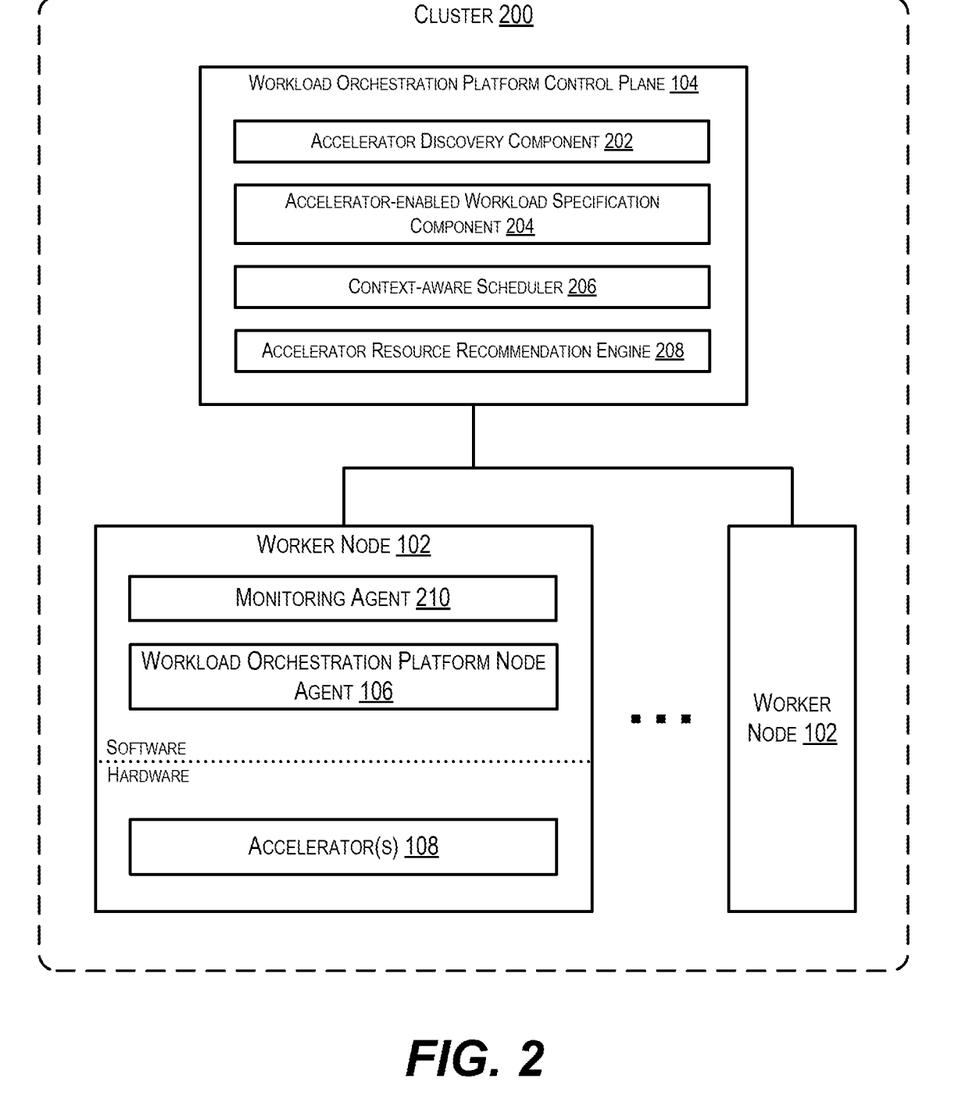
FIG. 2 depicts a modified version of the cluster of FIG. 1 that implements the framework of the present disclosure according to certain embodiments.

To address the foregoing and other similar issues, FIG. 2 depicts an enhanced version of cluster 100 (i.e., cluster 200) that implements a novel workload scheduling framework according to embodiments of the present disclosure. As shown, this framework includes the following new components within control plane 104: an accelerator discovery component 202, an accelerator-enabled workload specification component 204, a context-aware scheduler 206, and an accelerator resource recommendation engine 208. In addition, the framework includes a new monitoring agent 210 on each worker node 102.

At a high level, framework components 202-210 enable the workload orchestration platform of cluster 200 to support granular and flexible accelerator requirements for scheduling workloads on the accelerators of the cluster, as well as automate the determination of appropriate accelerator resource requirements for such workloads. Accordingly, the framework largely overcomes the limitations of existing workload orchestration platforms described above. The following sub-sections explain the general functionality of each framework component.

1.1 Accelerator Discovery Component

Accelerator discovery component 202 (hereinafter simply "discovery component") enables control plane 104 to (1) receive, from monitoring agents 210 running on worker nodes 102, static and dynamic metadata regarding the accelerators 108 residing on those worker nodes, (2) compile this metadata in a database, and (3) provide/publish (via, e.g., an application programming interface (API) or some other mechanism) the compiled metadata to the users of cluster 200 and to other components of control plane 104 such as context-aware scheduler 206. This allows the recipients to understand the topology/characteristics of accelerators 108 and to track the accelerators' real-time status. For example, a user can use this information to identify the specific accelerator models available in cluster 200, monitor their usage, and formulate accelerator requirements for his/her workload accordingly.

In certain embodiments, the static metadata compiled and published via discovery component 202 can include, for each accelerator in the cluster:
- the accelerator's physical location (e.g., an accelerator-to-worker node mapping);
- the accelerator's type (e.g., GPU, TPU, DSP, etc.);
- the accelerator's architecture (e.g., Nvidia Ampere, AMD RDNA 2, etc.);
- the accelerator's model (e.g., Nvidia A100, Nvidia H100, etc.);
- the accelerator's compute capacity and memory capacity; and
- the accelerator's features/capabilities (e.g., support for virtual GPU sharing, MIG, etc.).

Further, the dynamic metadata compiled and published via discovery component 202 can include, for each accelerator in the cluster:
- the accelerator's current usage in terms of compute, memory, and/or tenancy (i.e., the number of workloads running on the accelerator);
- the accelerator's current health; and
- the accelerator's current performance in terms of response time, throughput, etc.

1.2 Accelerator-Enabled Workload Specification Component

Accelerator-enabled workload specification component 204 (hereinafter simply "specification component") enables control plane 104 to receive, from the users of cluster 200, a list of fine-grained accelerator requirements for each of their accelerator-enabled workloads. This list may be received declaratively, such as via a workload specification document, or programmatically, such as via one or more APIs exposed by specification component 204.

In certain embodiments, the fine-grained accelerator requirements can include:
- an accelerator type, architecture, and/or model on which the workload should run;
- accelerator compute resources (e.g., X megahertz (Mhz)) and/or memory resources (e.g., Y GB) that should be allocated to the workload;

required accelerator features or capabilities (e.g., direct path I/O, virtual GPU sharing, MIG, etc.);

one or more accelerator SLAs (pertaining, e.g., to required accelerator response time, throughput, cost of execution, and/or other metrics) that should be met; and a prioritized list of accelerators in cluster 200, such that the workload is scheduled on the highest priority accelerator that meets the other requirements.

1.3 Context-Aware Scheduler

Context-aware scheduler 206 is configured to maintain, based on the static and dynamic metadata stored in the database of discovery component 202, a continuously updated snapshot of the accelerators in cluster 200 that captures their properties, availability, health, usage, and so on. In addition, context-aware scheduler 206 is configured to schedule new (or failed) workloads on the cluster's accelerators on a best effort basis, in accordance with the current accelerator snapshot and the fine-grained accelerator requirements provided by the workload user via specification component 204.

For example, assume a user creates an accelerator-enabled workload W with a first requirement that W should run only on Nvidia H100 GPUs and a second requirement that W needs 48 GB of VRAM. In this scenario, context-aware scheduler 206 can reference its accelerator snapshot for cluster 200 to identify the accelerators that are H100 GPUs and identify the subset of those H100 GPUs that currently have at least 48 GB of VRAM available. Context-aware scheduler 206 can then schedule W on one or more of the accelerators in the identified subset.

1.4 Monitoring Agent

Each monitoring agent 210 is configured to provide to control plane 104/discovery component 202 static and dynamic metadata regarding the accelerators on its respective worker node 102 as mentioned previously, as well as monitor the accelerator-enabled workloads placed on those accelerators to check for workload failures. If a failure is detected, monitoring agent 210 can notify context-aware scheduler 206, which can attempt to re-schedule the workload on another available accelerator that is consistent with the workload's accelerator requirements.

1.5 Accelerator Resource Recommendation Engine

Finally, accelerator resource recommendation engine 208 (hereinafter simply "recommendation engine") enables control plane 104 to automatically recommend an initial, optimal set of accelerator resource requirements for an accelerator-enabled workload via a sandbox testing mechanism. Engine 208 also enables the control plane to automatically adjust/right-size user-provided accelerator resource requirements for an accelerator-enabled workload based on telemetry data collected from the workload during its runtime. In some embodiments, these two features can be applied in tandem to the same workload, such that the workload user is presented an initial recommendation of accelerator resource requirements (which the user may or may not incorporate into the requirements they provide to control plane 104), and the user-provided requirements are further refined via right-sizing as the workload is run.

The remaining sections of this disclosure provide additional details for implementing the foregoing framework components according to certain embodiments, including a flowchart executed by control plane 104/context-aware scheduler 206 for scheduling an accelerator-enabled workload, a flowchart executed by monitoring agents 210 and context-aware scheduler 206 for handling a workload failure, and a flowchart executed by control plane 104/recommendation engine 208 for recommending an initial set of accelerator resource requirements and subsequently right-sizing those requirements. It should be appreciated that FIG. 2 and the foregoing high-level description are illustrative and not intended to limit embodiments of the present disclosure. For example, although FIG. 2 depicts a particular arrangement of framework components within cluster 200, other arrangements are possible (e.g., the functionality attributed to a particular component may be split into multiple components, components may be combined, etc.). One of ordinary skill in the art will recognize other variations, modifications, and alternatives.

2. Workload Scheduling

Figure 3:
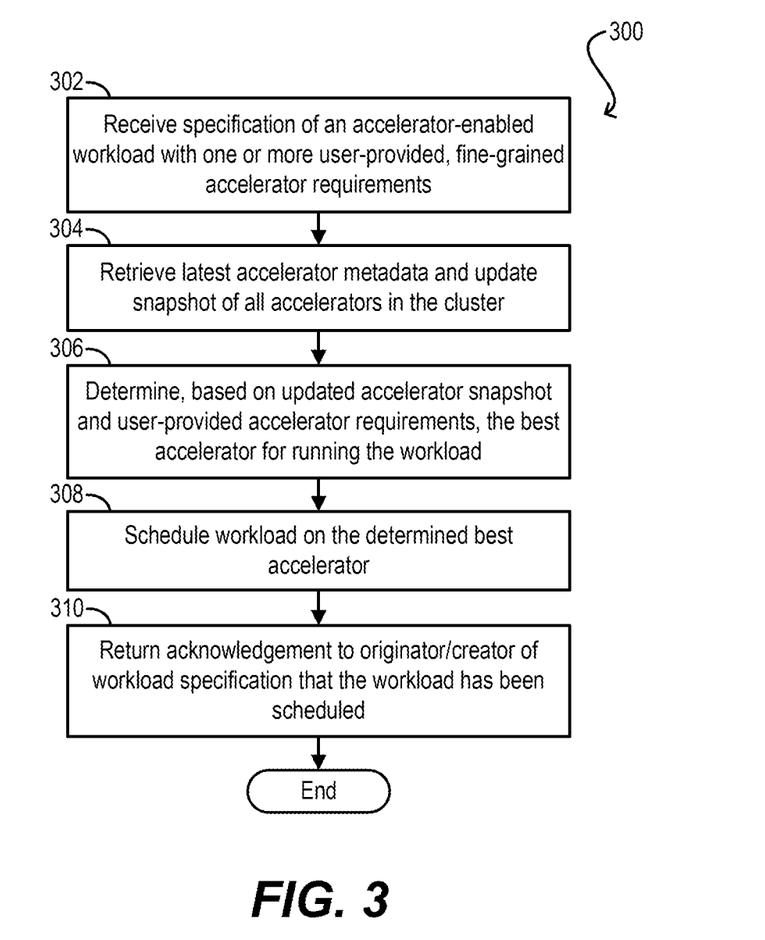
FIG. 3 depicts a flowchart for scheduling accelerator-enabled workloads according to certain embodiments.

FIG. 3 depicts a flowchart 300 that may be executed by control plane 104/context-aware scheduler 206 for scheduling an accelerator-enabled workload according to certain embodiments.

Starting with step 302, control plane 104 can receive, via its specification component 202, a specification of the workload with one or more user-provided, fine-grained accelerator requirements. As explained previously, these fine-grained requirements can be received declaratively or programmatically and can include an accelerator type/architecture/model, an allocation of accelerator resources, one or more accelerator SLAs, a prioritized list of accelerators, and so on.

Figure 4:
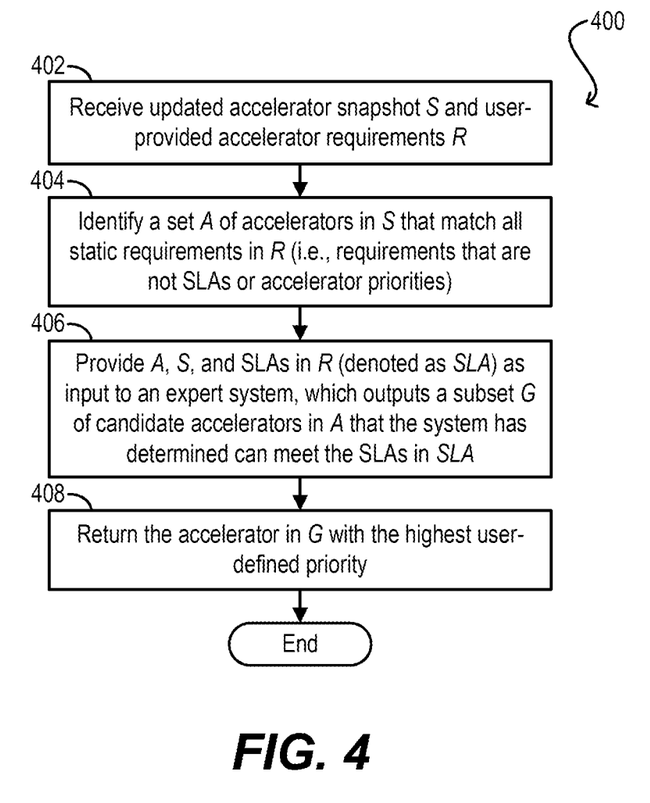
FIG. 4 depicts a flowchart for identifying a best accelerator for an accelerator-enabled workload according to certain embodiments.

At step 304, context-aware scheduler 206 can retrieve the latest accelerator metadata compiled via discovery component 202 and can update its snapshot of the accelerators in cluster 200. This accelerator snapshot can include the properties of the accelerators (e.g., location, type, architecture, model, resource capacities, etc.) and their current state (e.g., health, usage, etc.). Context-aware scheduler 206 can then determine, based on the updated accelerator snapshot and the accelerator requirements, the "best" (or in other words, target) accelerator for running the workload, which means the accelerator that best satisfies all user-provided requirements (step 306). FIG. 4 depicts an algorithm 400 for determining this best/target accelerator according to a particular embodiment.

As shown in FIG. 4, algorithm 400 begins by receiving the accelerator snapshot updated at step 304 of workflow 300 (denoted as S) and the user-provided accelerator requirements for the workload (denoted as R) (step 402). Based on this information, the algorithm first identifies a set A of accelerators in S that match all "static" accelerator requirements in R, or in other words requirements that do not pertain to SLAs or priorities (step 404). Examples of such static requirements include accelerator type/architecture/model and resource allocations.

The algorithm then provides A, S, and the SLAs included in R (denoted as SLA) as input to an expert system, which outputs a subset G of candidate accelerators in set A that the expert system has determined can meet the SLAs in SLA in view of their properties and current operating state (step 406). In one set of embodiments, this expert system can be implemented using one or more ML models that are trained via online or offline learning techniques to identify G.

Finally, the algorithm returns the accelerator in subset G that has the highest user-defined priority, assuming the workload user has provided a prioritized accelerator list (step 408). If no such list has been provided, the algorithm can select one of the accelerators in G at random or via some other criterion (e.g., the least loaded accelerator).

Returning now to flowchart 300, upon determining the best accelerator at step 308, context-aware scheduler 206 can schedule the workload on that accelerator (step 310). This step can involve, e.g., transmitting the workload specification (or a specification of a particular portion of the workload, such as a pod) and an identifier of the accelerator to the node agent running on the worker node where the accelerator resides. This will cause the node agent to initiate execution of the workload on that accelerator.

Finally, at step 312, context-aware scheduler 206 can return an acknowledgement to the originator/creator of the workload specification that the workload has been scheduled and the flowchart can end.

3. Workload Failure Handling

Figure 5:
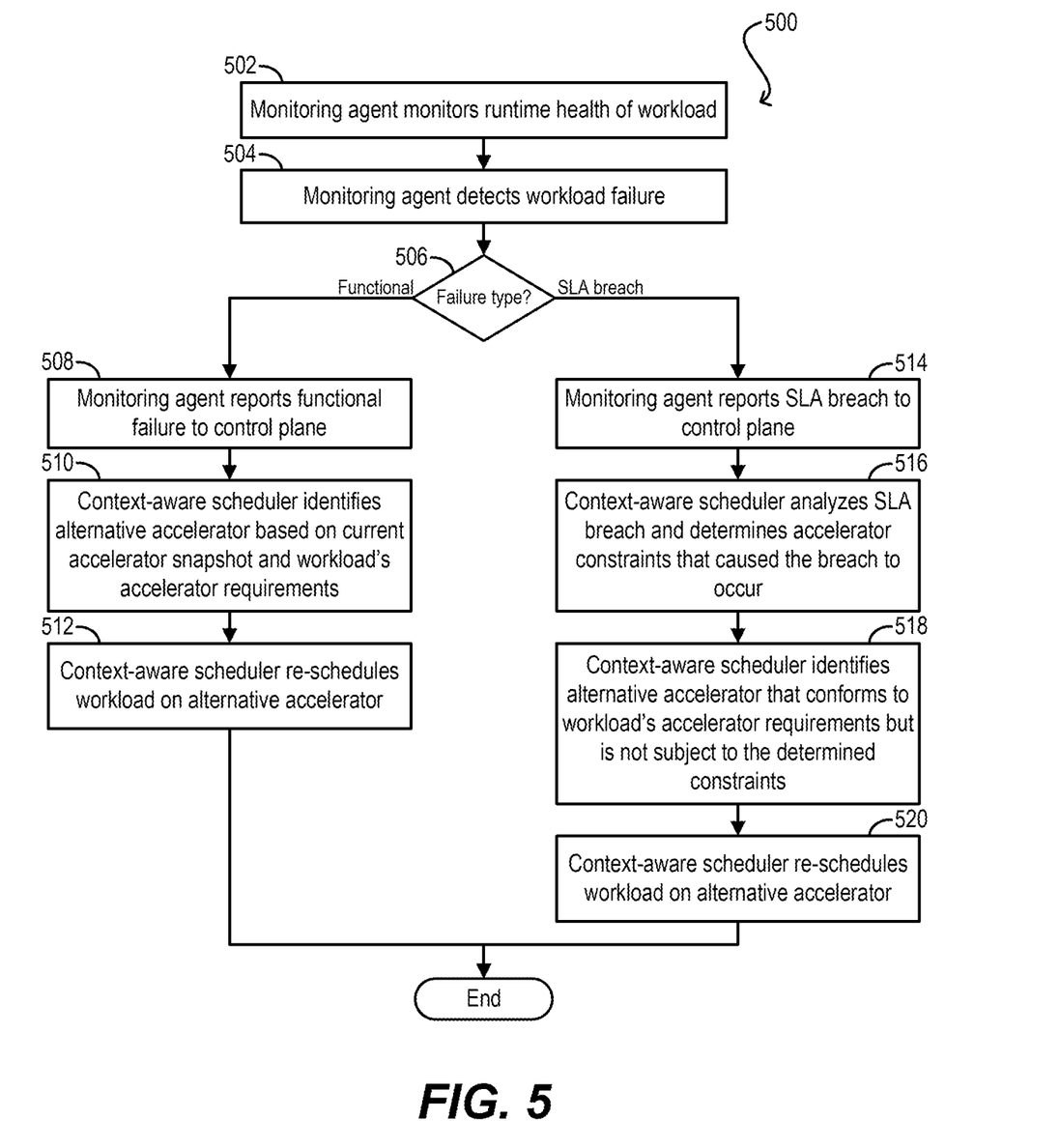
FIG. 5 depicts a flowchart for handling workload failures according to certain embodiments.

FIG. 5 depicts a flowchart 500 that may be executed by the monitoring agents 210 of worker nodes 102 and context-aware scheduler 206 for handling the failure of an accelerator-enabled workload according to certain embodiments. In particular, this flowchart can handle both functional failures (i.e., failures that cause the workload to become unresponsive, such as a hardware or network failure) and non-functional failures (i.e., failures where the workload remains operational but runs in a manner that breaches one or more of its user-defined SLA requirements).

Starting with step 502, the monitoring agent 210 present at the worker node where the accelerator-enabled workload is running can monitor the runtime health of the workload based on various parameters (e.g., response time, etc.).

At step 504, monitoring agent 210 can detect failure of the workload. If agent 210 determines that the failure is functional (step 506), it can report this to control plane 104 (step 508). In response, context-aware scheduler 206 can identify an alternative accelerator in cluster 200 for running the workload based on the current accelerator snapshot and the workload's accelerator requirements and can re-schedule the workload on that alternative accelerator (steps 508 and 510).

On the other hand, if monitoring agent 210 determines the failure pertains to an SLA breach at step 506, the agent can report the SLA breach to control plane 104 (step 514). In response, context-aware scheduler 206 can perform an analysis of the SLA breach and determine one or more accelerator constraints that caused the breach to occur (step 516). Examples of such constraints include high tenancy, resource usage above some threshold, and so on. Finally, context-aware scheduler 206 can identify an alternative accelerator in cluster 200 that conforms to the workload's accelerator requirements but is not subject to the determined constraints and can re-schedule the workload on that alternative accelerator (steps 518 and 520). Although not shown in the figure, in the case where no valid alternative accelerator is found, control plane 104 can simply notify the workload user of the failure.

4. Recommending and Right-Sizing Accelerator Resource Requirements

Figure 6A:
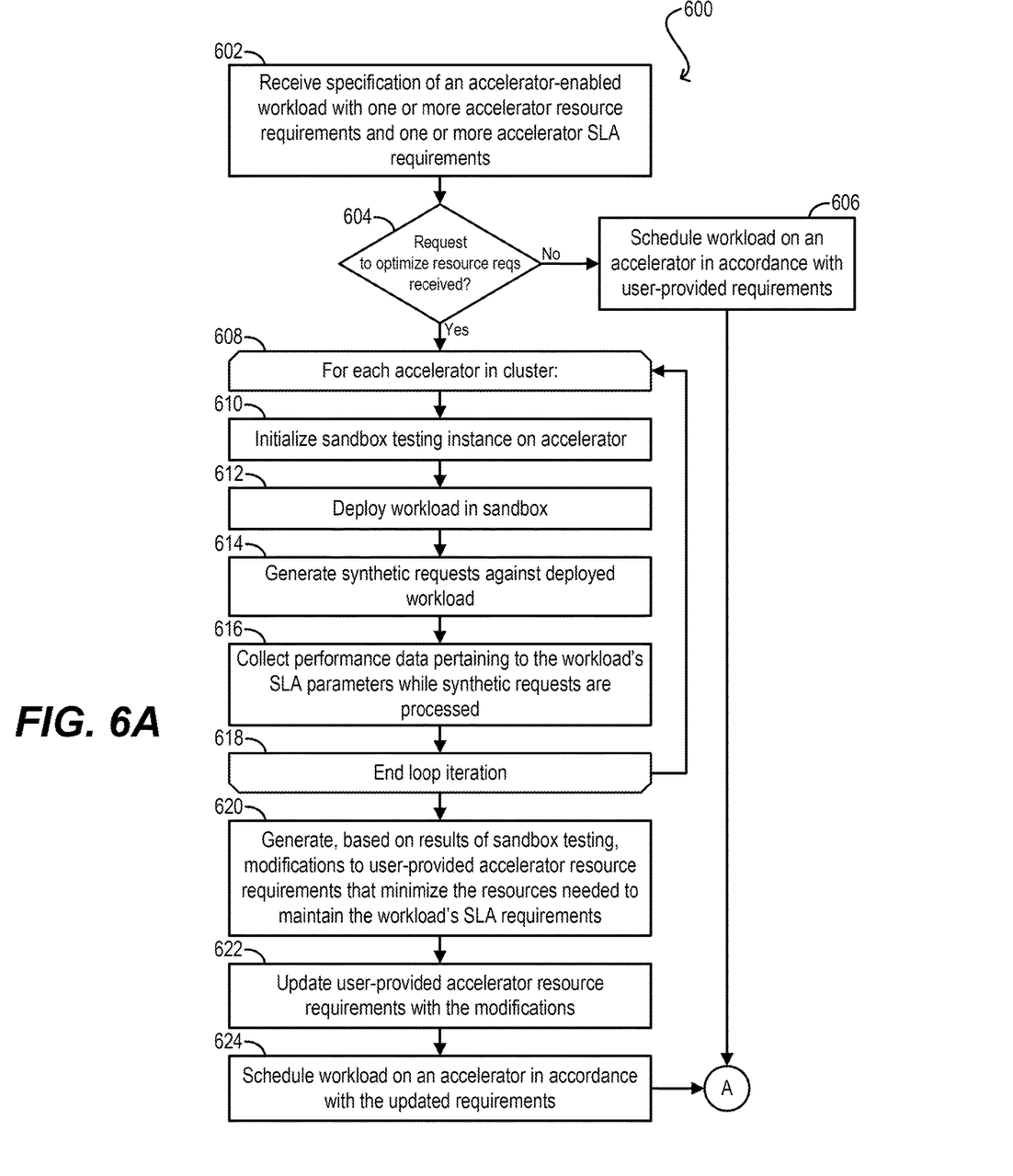
FIGS. 6A and 6B depict a flowchart for recommending and right-sizing accelerator resource requirements according to certain embodiments.
Figure 6B:
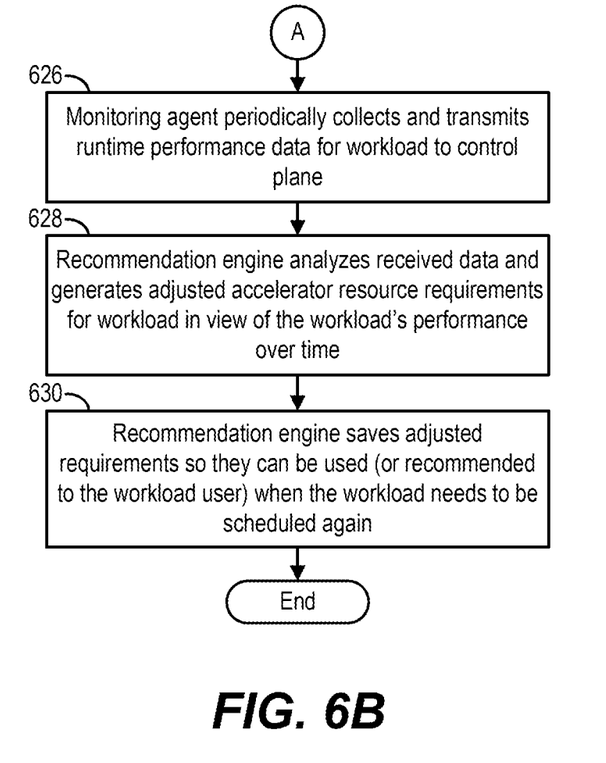

FIGS. 6A and 6B depict a flowchart 600 that may be executed by control plane 104/recommendation engine 208 for recommending an initial set of accelerator resource requirements for an accelerator-enabled workload and tuning/right-sizing those requirements based on performance data collected during the workload's runtime according to certain embodiments.

Starting with step 602 of FIG. 6A, control plane 104 can receive, via its specification component 202, a specification of an accelerator-enabled workload with user-provided accelerator requirements that include, among other things, one or more accelerator resource requirements (e.g., X Mhz of accelerator compute, Y GB of accelerator memory, etc.) and one or more SLA requirements (e.g., accelerator response time cannot exceed Z, etc.).

At step 604, control plane 104 can check whether the workload user has also submitted a request to optimize the user-provided accelerator resource requirements prior to deployment. If the answer is no, context-aware scheduler 206 can schedule the workload on an accelerator in accordance with the user-provided requirements (step 606) and the flowchart can proceed to FIG. 6B.

However, if the answer at step 604 is yes, control plane 104 can engage recommendation engine 208, which can enter a loop for each accelerator 108 present in cluster 200 (step 608). Within this loop, recommendation engine 208 can initialize a sandbox testing instance on the accelerator, deploy the workload on that sandbox instance, generate a set of synthetic requests against the deployed workload, and collect performance data pertaining to the workload's SLA parameters while those synthetic requests are being processed (steps 610-616). At step 618, recommendation engine 208 can reach the end of the current loop iteration and return to step 608 in order to test the next accelerator.

Once all of the accelerators have been tested, recommendation engine 208 can generate, based on the results of the sandbox testing, modifications to the original user-provided accelerator resource requirements that minimize the amount of resources needed to maintain the workload's SLA requirements (step 620). For example, if the original requirements specified an accelerator memory allocation of 12 GB but the sandbox testing indicated that only 8 GB are needed to satisfy the workload's SLAs, recommendation engine 208 can generate a modified accelerator memory requirement with an upper bound of 8 GB.

Recommendation engine 208 can then update the original user-provided requirements with the modifications (step 622) and context-aware scheduler 206 can schedule the workload on an accelerator in accordance with the modified requirements (step 624). Alternatively, recommendation engine 208 can present the modified accelerator resource requirements as recommendations to the user and ask the user to accept or decline the recommendation (not shown).

Turning now to FIG. 6B, once the workload is scheduled, the monitoring agent 210 residing at the worker node where the workload is running can periodically collect runtime performance data for the workload and transmit this data to recommendation engine 208 (step 626).

In response, recommendation engine 208 can analyze the received data and generate adjusted accelerator resource requirements for the workload in view of the workload's runtime performance over time (step 628). For example, recommendation engine 208 may determine that tighter resource upper bounds are appropriate in the case where a substantial portion of the workload's allocated resources are under-utilized and that slacker resource upper bounds are appropriate in the case of resource over-utilization (or if an SLA breach occurs).

Finally, at step 630, recommendation engine 208 can save the adjusted requirements so that they can be automatically used, or recommended to the workload user, when the same workload needs to be scheduled again on the cluster.

Certain embodiments described herein can employ various computer-implemented operations involving data stored in computer systems. For example, these operations can require physical manipulation of physical quantities-usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a generic computer system comprising one or more general purpose processors (e.g., Intel or AMD x86 processors) selectively activated or configured by program code stored in the computer system. In particular, various generic computer systems may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any storage device, based on any existing or subsequently developed technology, that can store data and/or computer programs in a non-transitory state for access by a computer system. Examples of non-transitory computer readable media include a hard drive, network attached storage (NAS), read-only memory, random-access memory, flash-based nonvolatile memory (e.g., a flash memory card or a solid state disk), persistent memory, NVMe device, a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations, and equivalents can be employed without departing from the scope hereof as defined by the claims.

What is claimed is:

1. A method comprising:
   receiving, by a computer system acting as a control plane of a workload orchestration platform, one or more accelerator requirements for a workload to be scheduled on an accelerator in a cluster, the cluster comprising a plurality of accelerators, the one or more accelerator requirements including:
      an accelerator type, architecture, or model on which the workload should be scheduled;
      an amount of accelerator compute or memory resources that should be allocated to the workload; and/or
      an accelerator service level agreement (SLA) that should be met for the workload;
   creating, by the computer system, an accelerator snapshot identifying each accelerator in the cluster and including static and dynamic metadata pertaining to said each accelerator;
   determining, by the computer system based on the accelerator snapshot and the one or more accelerator requirements, a target accelerator for the workload; and
   scheduling, by the computer system, the workload on the target accelerator;
   wherein:
   the one or more accelerator requirements further include a prioritized accelerator list; and
   determining the target accelerator comprises:
      identifying a first subset of accelerators in the cluster that satisfy all static requirements in the one or more accelerator requirements;
      providing the accelerator snapshot, the first subset of accelerators, and all accelerator SLAs in the one or more accelerator requirements to an expert system, which outputs a second subset of the first subset that the expert system has determined can meet said all accelerator SLAs; and
      identifying an accelerator in the second subset with a highest user-defined priority as defined in the prioritized accelerator list.

2. The method of claim 1 further comprising:
   determining that the workload has failed due to a functional failure;
   identifying an alternative accelerator in the cluster based on a current accelerator snapshot and the one or more accelerator requirements; and
   re-scheduling the workload on the alternative accelerator.

3. The method of claim 1 further comprising:
   determining that the workload has failed due to a breach of the SLA;
   determining one or more constraints at the target accelerator that caused the breach to occur;
   identifying an alternative accelerator in the cluster that conforms to the one or more accelerator requirements but is not subject to the one or more constraints; and
   re-scheduling the workload on the alternative accelerator.

4. The method of claim 1 further comprising, prior to determining the target accelerator:
   for each accelerator in the cluster:
      initializing a sandbox testing instance on the accelerator;
      deploying the workload in the sandbox testing instance;
      generating synthetic requests against the deployed workload; and
      collecting performance data pertaining to the SLA while the synthetic requests are processed; and
   modifying the amount of accelerator compute or memory resources that should be allocated to the workload based on the performance data.

5. The method of claim 1 further comprising:
   receiving runtime performance data for the workload;
   generating adjusted versions of the one or more accelerator requirements based on the runtime performance data; and saving the adjusted versions for use in re-scheduling the workload at a future time.

6. A non-transitory computer readable storage medium comprising program code executable by a computer system acting as a control plane of a workload orchestration platform, the program code causing the computer system to execute a method comprising:
receiving one or more accelerator requirements for a workload to be scheduled on an accelerator in a cluster, the cluster comprising a plurality of accelerators, the one or more accelerator requirements including:
an accelerator type, architecture, or model on which the workload should be scheduled;
an amount of accelerator compute or memory resources that should be allocated to the workload; and/or
an accelerator service level agreement (SLA) that should be met for the workload;
creating an accelerator snapshot identifying each accelerator in the cluster and including static and dynamic metadata pertaining to said each accelerator;
determining, based on the accelerator snapshot and the one or more accelerator requirements, a target accelerator for the workload; and
scheduling the workload on the target accelerator;
wherein:
the one or more accelerator requirements further include a prioritized accelerator list; and
determining the target accelerator comprises:
identifying a first subset of accelerators in the cluster that satisfy all static requirements in the one or more accelerator requirements;
providing the accelerator snapshot, the first subset of accelerators, and all accelerator SLAs in the one or more accelerator requirements to an expert system, which outputs a second subset of the first subset that the expert system has determined can meet said all accelerator SLAs; and
identifying an accelerator in the second subset with a highest user-defined priority as defined in the prioritized accelerator list.

7. The non-transitory computer readable storage medium of claim 6 wherein the method further comprises:
determining that the workload has failed due to a functional failure;
identifying an alternative accelerator in the cluster based on a current accelerator snapshot and the one or more accelerator requirements; and
re-scheduling the workload on the alternative accelerator.

8. The non-transitory computer readable storage medium of claim 6 wherein the method further comprises:
determining that the workload has failed due to a breach of the SLA;
determining one or more constraints at the target accelerator that caused the breach to occur;
identifying an alternative accelerator in the cluster that conforms to the one or more accelerator requirements but is not subject to the one or more constraints; and
re-scheduling the workload on the alternative accelerator.

9. The non-transitory computer readable storage medium of claim 6 wherein the method further comprises, prior to determining the target accelerator:
for each accelerator in the cluster:
initializing a sandbox testing instance on the accelerator;
deploying the workload in the sandbox testing instance;
generating synthetic requests against the deployed workload; and
collecting performance data pertaining to the SLA while the synthetic requests are processed; and
modifying the amount of accelerator compute or memory resources that should be allocated to the workload based on the performance data.

10. The non-transitory computer readable storage medium of claim 6 wherein the method further comprises:
receiving runtime performance data for the workload;
generating adjusted versions of the one or more accelerator requirements based on the runtime performance data; and
saving the adjusted versions for use in re-scheduling the workload at a future time.

11. A computer system acting as a control plane of a workload orchestration platform, the computer system comprising:
a processor; and
a non-transitory computer readable medium comprising program code that, when executed, causes the processor to:
receive one or more accelerator requirements for a workload to be scheduled on an accelerator in a cluster, the cluster comprising a plurality of accelerators, the one or more accelerator requirements including:
an accelerator type, architecture, or model on which the workload should be scheduled;
an amount of accelerator compute or memory resources that should be allocated to the workload; and/or
an accelerator service level agreement (SLA) that should be met for the workload;
create an accelerator snapshot identifying each accelerator in the cluster and including static and dynamic metadata pertaining to said each accelerator;
determine, based on the accelerator snapshot and the one or more accelerator requirements, a target accelerator for the workload; and
schedule the workload on the target accelerator;
wherein:
the one or more accelerator requirements further include a prioritized accelerator list; and
determining the target accelerator comprises:
identifying a first subset of accelerators in the cluster that satisfy all static requirements in the one or more accelerator requirements;
providing the accelerator snapshot, the first subset of accelerators, and all accelerator SLAs in the one or more accelerator requirements to an expert system, which outputs a second subset of the first subset that the expert system has determined can meet said all accelerator SLAs; and
identifying an accelerator in the second subset with a highest user-defined priority as defined in the prioritized accelerator list.

12. The computer system of claim 11 wherein the program code further causes the processor to:
determine that the workload has failed due to a functional failure;
identify an alternative accelerator in the cluster based on a current accelerator snapshot and the one or more accelerator requirements; and
re-schedule the workload on the alternative accelerator.

13. The computer system of claim 11 wherein the program code further causes the processor to:
determine that the workload has failed due to a breach of the SLA;

determine one or more constraints at the target accelerator that caused the breach to occur;
identify an alternative accelerator in the cluster that conforms to the one or more accelerator requirements but is not subject to the one or more constraints; and
re-schedule the workload on the alternative accelerator.

14. The computer system of claim 11 wherein the program code further causes the processor to, prior to determining the target accelerator:
for each accelerator in the cluster:
  initialize a sandbox testing instance on the accelerator;
  deploy the workload in the sandbox testing instance;
  generate synthetic requests against the deployed workload; and
  collect performance data pertaining to the SLA while the synthetic requests are processed; and
modify the amount of accelerator compute or memory resources that should be allocated to the workload based on the performance data.

15. The computer system of claim 11 wherein the program code further causes the processor to:
receive runtime performance data for the workload;
generate adjusted versions of the one or more accelerator requirements based on the runtime performance data; and
save the adjusted versions for use in re-scheduling the workload at a future time.

* * * * *